United States Patent
Yang (10) Patent No.: US 7,240,659 B2
(45) Date of Patent: Jul. 10, 2007

(54) TRANSITION STRATEGY FOR ENGINE OPERATION WITH SPARK IGNITION AND HOMOGENEOUS CHARGE COMPRESSION IGNITION MODES

(75) Inventor: Jialin Yang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/232,821

(22) Filed: Sep. 21, 2005

(65) Prior Publication Data

US 2007/0062483 A1   Mar. 22, 2007

(51) Int. Cl.
*F02B 17/00* (2006.01)
*F02B 5/00* (2006.01)

(52) U.S. Cl. .................. 123/295; 123/294; 123/299; 123/305

(58) Field of Classification Search ............. 123/27 R, 123/90.15, 294, 295, 299, 300, 304, 435, 123/305
See application file for complete search history.

(56) References Cited

U.S. PATENT DOCUMENTS

| | | | |
|---|---|---|---|
| 5,036,668 A | 8/1991 | Hardy | |
| 6,267,097 B1 | 7/2001 | Urushihara et al. | |
| 6,276,334 B1 | 8/2001 | Flynn et al. | |
| 6,293,246 B1 | 9/2001 | Tanahashi et al. | |
| 6,295,973 B1 | 10/2001 | Yang | |
| 6,336,436 B1 | 1/2002 | Miyakubo et al. | |
| 6,390,054 B1 | 5/2002 | Yang | |
| 6,516,774 B2 | 2/2003 | zur Loye et al. | |
| 6,561,157 B2 * | 5/2003 | zur Loye et al. | ........... 123/295 |
| 6,570,265 B1 | 5/2003 | Shiraishi et al. | |
| 6,619,254 B2 | 9/2003 | Chmela et al. | |
| 6,622,710 B2 | 9/2003 | Hasegawa et al. | |
| 6,644,019 B2 | 11/2003 | Morikawa et al. | |
| 6,651,432 B1 | 11/2003 | Gray, Jr. | |
| 6,675,579 B1 | 1/2004 | Yang | |
| 6,725,825 B1 | 4/2004 | Kurtz et al. | |
| 6,739,295 B1 | 5/2004 | Yamaoka et al. | |
| 6,923,167 B2 | 8/2005 | Flowers | |
| 6,932,175 B2 | 8/2005 | Teraji et al. | |
| 7,089,913 B2 | 8/2006 | Yamaoka et al. | |
| 2004/0065279 A1 | 4/2004 | Hitomi et al. | |
| 2004/0149255 A1 | 8/2004 | zur Loye et al. | |
| 2004/0182359 A1 | 9/2004 | Stewart et al. | |

(Continued)

OTHER PUBLICATIONS

O. Lang et al, "Thermodynamical and Mechanical Approach Towards a Variable Valve Train for the Controlled Auto Ignition Combustion Process," SAE Technical Paper No. 2005-01-07, Apr. 11-14, 2005.

*Primary Examiner*—T. M. Argenbright
(74) *Attorney, Agent, or Firm*—Allan J. Lippa; Alleman Hall McCoy Russell & Tuttle LLP (57) ABSTRACT

A method of operating an internal combustion engine having a combustion chamber with a piston and a spark plug, when transitioning between spark ignition combustion and autoignition combustion, creating a first mixture of air and fuel, adjusting an operating condition of the engine so that said first mixture of air and fuel in the combustion chamber approaches, but does not achieve, the autoignition temperature, and performing a spark from the spark plug so that at least a portion of said first mixture combusts to raise a remaining portion of said first mixture to said autoignition temperature.

20 Claims, 9 Drawing Sheets

U.S. PATENT DOCUMENTS

2004/0194746 A1    10/2004  Yamaoka et al.
2005/0121008 A1     6/2005  Kikenny et al.
2005/0173169 A1     8/2005  Gray, Jr.
2006/0065234 A1     3/2006  Weiss

* cited by examiner

TRANSITION STRATEGY FOR ENGINE OPERATION WITH SPARK IGNITION AND HOMOGENEOUS CHARGE COMPRESSION IGNITION MODES

FIELD

The present application relates to controlling engine operation during various combustion modes.

BACKGROUND AND SUMMARY

Various types of combustion may be used in an internal combustion engine. For example, spark ignition (SI) of a homogenous mixture during the expansion stroke is one example method. This method relies on a timed spark from a sparking plug in order to achieve ignition within the combustion chamber of an air/fuel mixture. Another type of combustion is homogeneous charge compression ignition (HCCI), which occurs when the temperature of the air/fuel mixture within combustion chamber attains the autoignition temperature of the specific fuel. HCCI operations can be used to provide greater fuel efficiency and reduced NOx production under some conditions.

In some gasoline engines, the engine can perform SI operation under some conditions, and HCCI operation under other conditions in order to achieve improved overall operation. However, HCCI combustion can require the mixture to be diluted by air or combustion products (residuals), thus creating a high inlet pressure in HCCI mode (i.e. un-throttled or boosted). In contrast, SI combustion can operate with the mixture at, or close to, stoichiometric proportions. Thus at part load, inlet pressure with SI operation may be lower than atmospheric pressure to reduce the fresh air mass. As a result, during combustion mode transitions (such as at part load), a substantially rapid change of intake pressure and/or temperature is often desired.

One approach to performing a transition between combustion modes is found in U.S. Pat. No. 6,336,436. In this approach, fuel injection timing is adjusted during a transition operation wherein stratified charge combustion is performed. The stratified charge combustion is performed by injecting fuel during a compression stroke. In this manner, the intake pressure and/or temperature may be adjusted gradually over a period of multiple cycles.

The inventors herein have recognized a disadvantage with such an approach. As one example, under some conditions, utilizing stratified charge combustion may still require a substantially rapid change in intake manifold pressure. In another example, the disparate type of combustion between stratified and compression ignition operation may cause degraded performance during the transition.

In one approach, the above issues may be addressed by a method of operating an internal combustion engine having a combustion chamber with a piston and a spark plug, comprising: when transitioning between spark ignition combustion and autoignition combustion, creating a first mixture of air and fuel, adjusting an operating condition of the engine so that said first mixture of air and fuel in the combustion chamber approaches, but does not achieve, the autoignition temperature, and performing a spark from the spark plug so that at least a portion of said first mixture combusts to raise a remaining portion of said first mixture to said autoignition temperature.

In this way, it is possible to provide transitional operation in place of, or in addition to, a stratified transition. This can provide a mode of operation that is closer to compression ignition operation so that the change in conditions may be reduced during the transition. Alternatively, or in addition, additional operation may be provided during the transition so that a slower manifold pressure change can be provided. Thus, an improved transition can be provided, at least under some conditions.

DETAILED DESCRIPTION OF THE DRAWINGS

DETAILED DESCRIPTION

Figure 1:
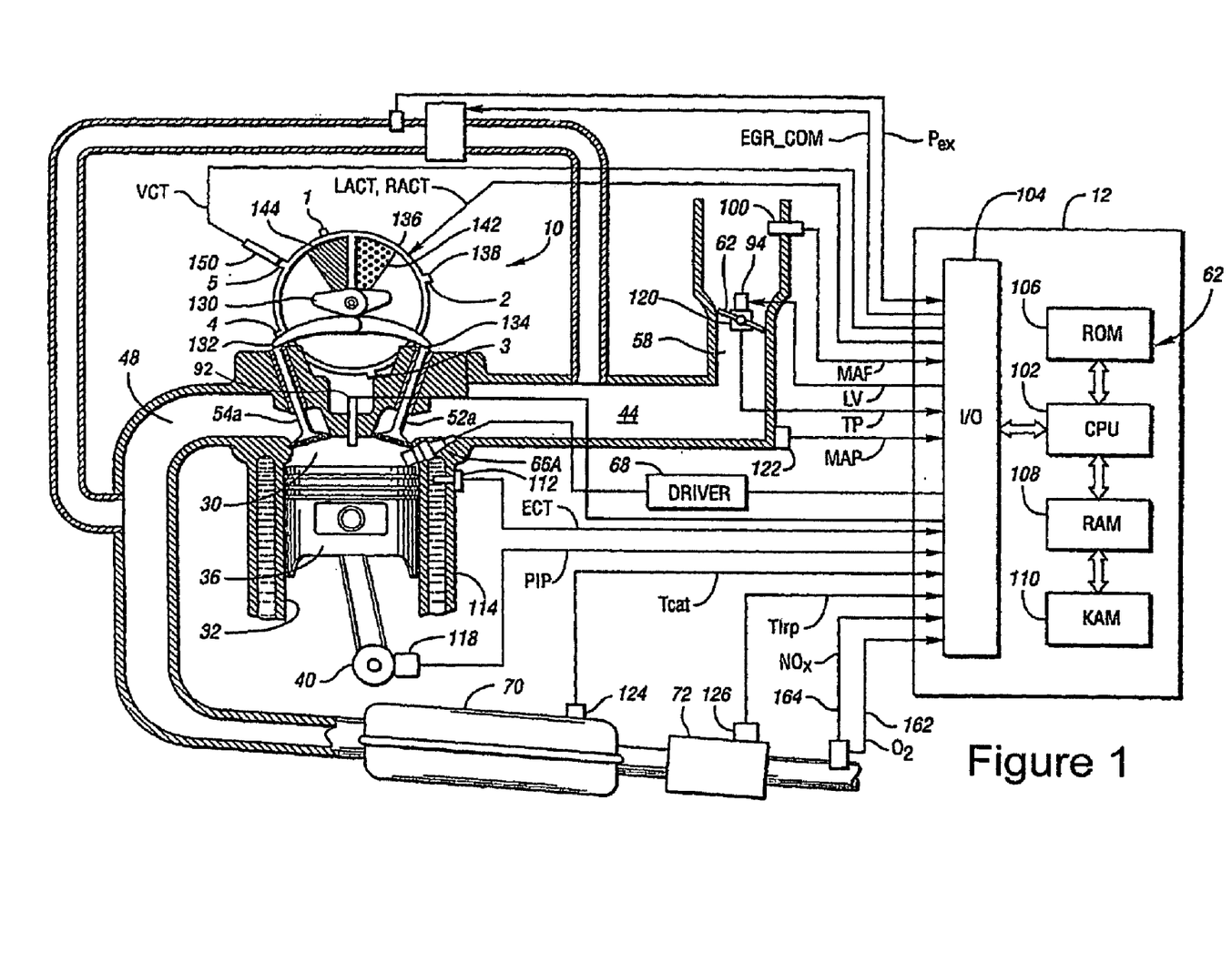
FIG. 1 shows an internal combustion engine and control system.

Direct injection spark ignited internal combustion engine 10, comprising a plurality of combustion chambers, is controlled by electronic engine controller 12 as shown in FIG. 1. Combustion chamber 30 of engine 10 includes combustion chamber walls 32 with piston 36 positioned therein and connected to crankshaft 40. In one example, piston 36 includes a recess or bowl (not shown) to form selected levels of stratification or homogenization of charges of air and fuel. Alternatively, a flat piston may also be used.

Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. Exhaust gas oxygen sensor 76 is shown coupled to exhaust manifold 48 upstream of catalytic converter 70. In an alternative embodiment, sensor 76 can provide a signal which indicates whether exhaust air-fuel ratio is either lean of stoichiometry or rich of stoichiometry. A mechanical supercharger (not shown) or mechanical turbocharger (not shown) may be coupled to engine 10, in one example.

Distributorless ignition system (not shown) provides ignition spark to combustion chamber 30 via spark plug 92 in response to spark advance signal SA from controller 12. Controller 12 activates fuel injector 66 during the intake stroke so that a desired air-fuel ratio mixture is formed when ignition power is supplied to spark plug 92 by ignition system 88. Controller 12 controls the amount of fuel delivered by fuel injector 66 so that the air-fuel ratio mixture in chamber 30 can be selected to be substantially at (or near) stoichiometry, a value rich of stoichiometry, or a value lean of stoichiometry.

Nitrogen oxide (NOx) absorbent or trap 72 is shown positioned downstream of catalytic converter 70. NOx trap 72 absorbs NOx when engine 10 is operating lean of stoichiometry. The absorbed NOx is subsequently reacted with HC and catalyzed during a NOx purge cycle when controller 12 causes engine 10 to operate in either a rich mode or a near stoichiometric mode.

Controller 12 is shown in FIG. 1 as a conventional microcomputer including: microprocessor unit 102, input/output ports 104, an electronic storage medium of executing programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

As will be described in more detail below, combustion in engine 10 can be of various types, depending on operating conditions. In one example, spark ignition (SI) can be employed where the engine utilizes a sparking device, such as spark plug coupled in the combustion chamber, to regulate the timing of combustion of combustion chamber gas at a predetermined time after top dead center of the expansion stroke. During a spark ignition operation, the temperature of the air entering the combustion chamber is considerably lower than the temperature required for autoignition. SI combustion may be utilized during engine warm-up periods or during periods of high engine load. However, while SI combustion may be utilized across a broad range of engine load and engine speed it may produce increased levels of NOx and lower fuel efficiency when compared with other types of combustion.

Another type of combustion that may be employed by engine 10 uses homogeneous charge compression ignition (HCCI), where autoignition of combustion chamber gases occurs at a predetermined point after the compression stroke of the combustion cycle or near top dead center of compression. Since the air/fuel mixture is highly diluted by air or residuals, which results in lower combustion gas temperature, the production of NOx may be dramatically reduced compared to levels found in SI combustion. Further, fuel efficiency with autoignition of lean (or diluted) air/fuel mixture may be increased by reducing the engine pumping loss, increasing gas specific heat ratio, and by utilizing a higher compression ratio.

During HCCI combustion, autoignition of the combustion chamber gas is controlled to occur at a desired position of the piston to generate desired engine torque, and thus it may not be necessary to perform a spark from a sparking mechanism in to achieve combustion. However, a late timing of the spark plug, after an autoignition temperature should have been attained, may be utilized as a backup ignition source in the case that autoignition does not occur.

A third type of combustion that may be performed by engine 10 utilizes a sparking device to initiate (or assist) combustion when the temperature of the combustion chamber gas approaches an autoignition temperature (e.g., reaches a level substantially near autoignition without achieving combustion). Such a spark assist type of combustion can exhibit increased fuel efficiency and reduce NOx production over that of SI combustion, yet may operate in higher load range than compared with HCCI combustion. Spark assist may also offer an overall larger window for controlling temperature since it may not be necessary to precisely attain an autoignition temperature at a specified timing in the engine cycle. In other words, without spark assistance a small change in temperature may result in a rather large change in combustion timing, thus affecting engine output and performance. In the spark assist mode, it is possible to attain many of the benefits of HCCI combustion, but to rely on the spark timing to provide the final energy needed to attain autoignition and thus more precisely control the timing of combustion. Thus, in one example, under some conditions, spark assist may also be used during transitions between SI combustion and HCCI.

In one embodiment, the spark assist mode may be operated where a small amount of fuel is provided to the gases near the spark plug. This small cloud of fuel may be used to allow a flame to better propagate and generate increased pressure in the cylinder to thereby initiate auto-ignition of the remaining air-fuel mixture. Thus, a relatively small cloud of richer gases may be used that are proximate to the spark plug, which can also be homogenous, stratified, or slightly stratified. One approach to provide such operation may be to utilize a second direct fuel injection in the compression stroke. Therefore, spark assist operation may utilize a single or multiple injections. In one embodiment, the air/fuel mixture within the combustion chamber could be homogeneous while in another embodiment, it could be substantially homogeneous with regions that are lean and less lean, wherein the less lean region is delivered in the vicinity of the spark.

One example of an application involving at least the three combustion modes presented above may include the use of SI for startup and/or after engine startup during an engine warming period. After such engine startup and engine warming, the combustion process may transition through spark assist combustion to HCCI combustion for improved economy and emissions. During periods of high engine load requirements, spark assist may be activated to ensure proper combustion timing. As the engine is returned to a low or moderate load requirement, the involvement of spark assist may cease in order to realize the full benefits of HCCI.

Figure 2:
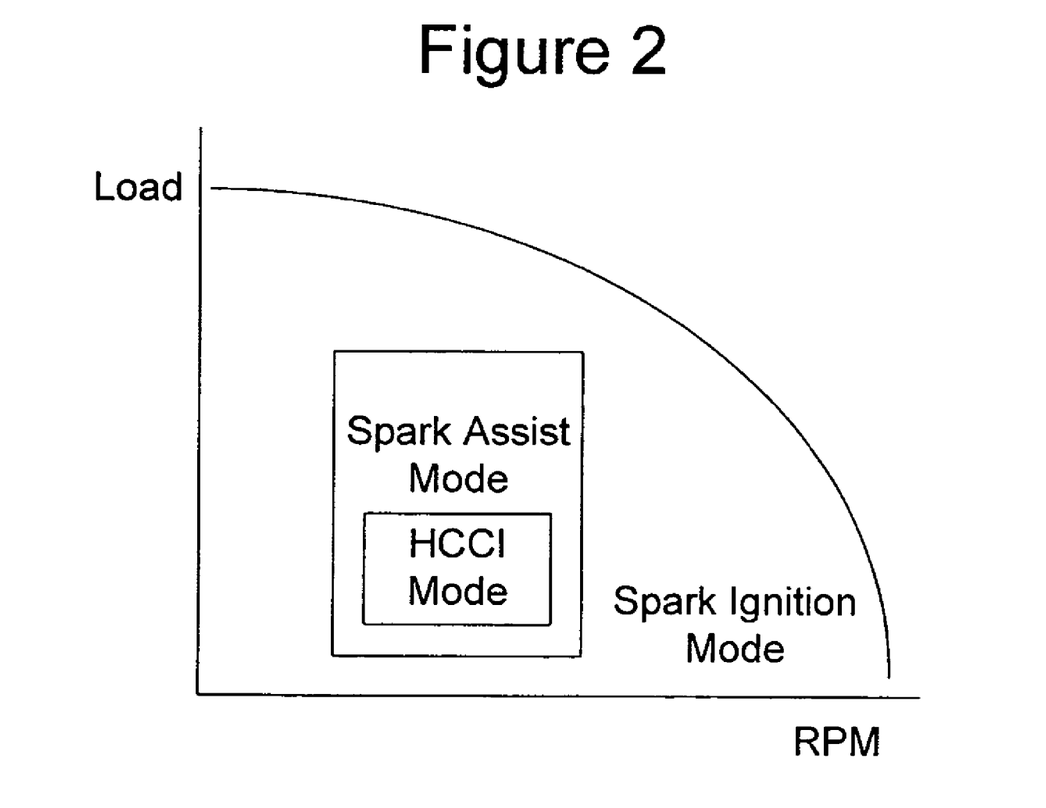
FIG. 2 shows various combustion modes operating at varying load/rpm.

In one embodiment of the application, engine operation can be divided into different desired combustion modes depending on the engine speed and load. FIG. 2 shows three combustion mode regions depending on engine speed and load. While FIG. 2 shows example mode regions, these may be adjusted depending on various factors, such as engine design, emissions, etc. Also, while FIG. 2 shows three different modes, additional modes may also be used. Further, only two modes may be used, if desired.

Continuing with FIG. 2, in this example, the HCCI mode is in a lower speed and load region, and is surrounded by a spark-assist mode. Further, spark ignition mode is shown for the remainder of the operating envelope. While FIG. 2 shows different modes depending on speed and load, various other operating parameters may be used, such as desired torque, manifold pressure, indicated torque, engine brake torque, temperature, combinations thereof, and various others.

As shown in FIG. 2, the HCCI region may be contained within the SI operating region in one example. Thus, in one embodiment, the ignition strategy can follow a transitional spark assist mode prior to entering the HCCI combustion region from the outer SI combustion region. However, in an alternative embodiment, the engine may transition directly between SI and HCCI modes or any combination of combustion modes. In yet another embodiment, transition between modes may be facilitated by an intermediate combustion mode. Transitions utilizing an intermediate combustion mode are discussed below with reference to FIGS. 6 and 7. Further, as noted above, additional modes may be used, such as stratified combustion, or others.

Figure 3A:
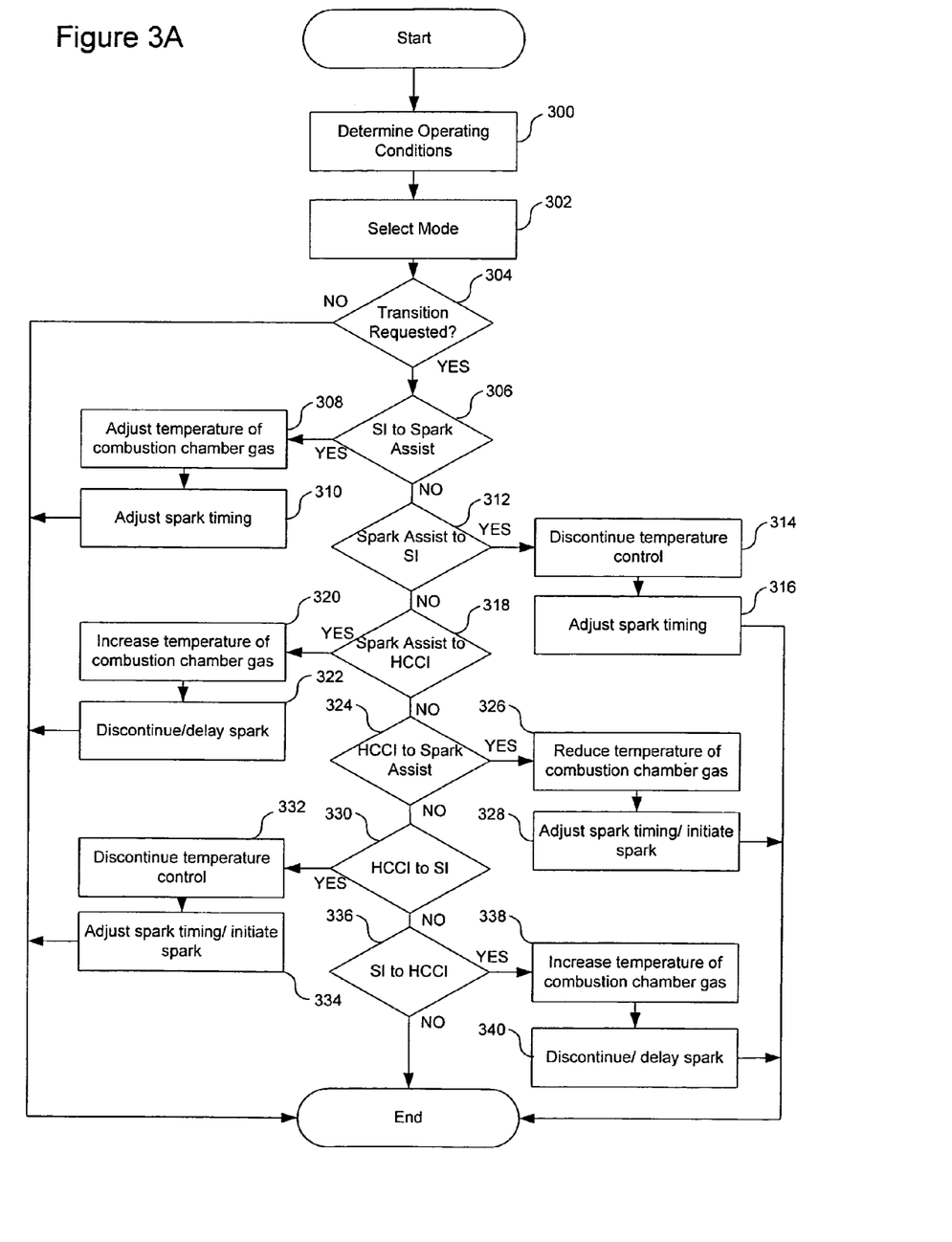
FIGS. 3A and 3B are flowcharts depicting an example method for selectively varying the combustion mode during engine operation.
Figure 3B:
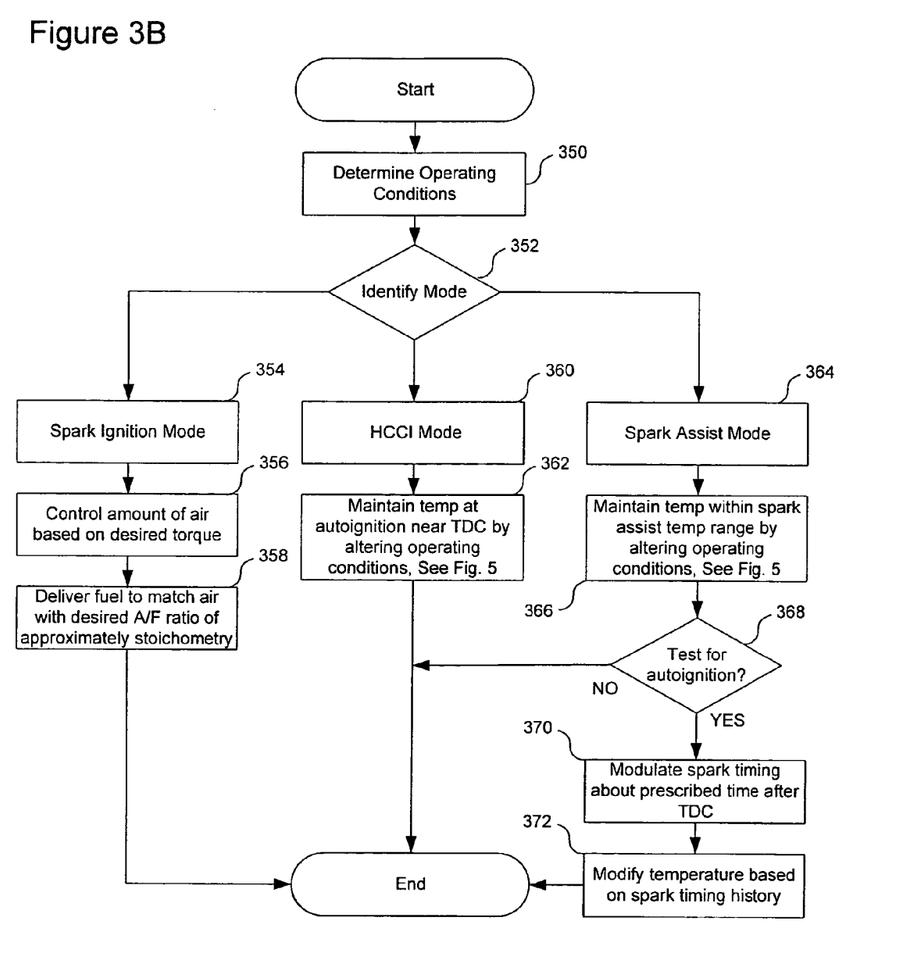

Referring now to FIGS. 3A and 3B, example routines are described for performing an engine control operation. The routines described by FIGS. 3A and 3B can provide for an improved fuel efficiency and reduction of NOx production through selectively enabling a combustion mode suitable for particular engine and/or vehicle conditions (such as engine load), thus advantageously utilizing both HCCI and spark assist modes.

Specifically, in FIG. 3A, a routine is described for selecting a desired engine combustion mode and modifying engine operating parameters during transitions between combustion modes. First, at step 300, the operating conditions of the engine are determined, including, for example, desired engine output, desired load, desired air-fuel ratio, and others. Next, at 302, the appropriate combustion mode is selected based on the operating conditions, as well as other engine and/or vehicle conditions, such as exhaust conditions, catalyst conditions, temperature, and others. In one example, the routine uses a map similar to that of FIG. 2 to select a desired combustion mode. Also, the mode selected may be based on transitional conditions. For example, if it is desired to change from SI mode to HCCI mode, the routine may select to transition through a spark assist mode to provide an improved transition from SI to HCCI combustion, or vice versa. Specifically, it may be difficult under some conditions to transition directly between SI to HCCI combustion, and thus as the spark assist combustion may be controlled with less precise temperature control of combustion gases, it may be used transitionally between modes.

Next, in step 304 it is judged whether a transition between modes is desired based on the desired mode and the current combustion mode. If no transition is to occur, the routine ends. Alternatively, it is judged in step 304 that a transition is requested, the routine proceeds to step 306.

At step 306, it is judged if a transition from SI to spark assist is requested. If the answer to step 306 is yes, the routine proceeds to step 308, where the temperature of the combustion chamber gas is adjusted. The adjustment of temperature may be performed by modifying the operating parameters of the engine such as through varying the valve timing, addition of exhaust gas recirculation (EGR), increasing the compression ratio, controlling aircharge temperature via a heat exchanger configuration, the contribution of supercharging or turbocharging or a combination thereof. Next, the routine proceeds to step 310 where the spark timing is adjusted, as described in more detail below with regard to FIG. 3B and FIG. 4, for example. Next, the routine ends. Alternatively, if the answer to step 306 is no, the routine proceeds to step 312.

At step 312 it is judged if a transition from spark assist to SI is requested. If the answer to step 312 is yes, then the routine proceeds to step 314, where the temperature control of the combustion chamber gas is discontinued. Next, the routine proceeds to step 316 where the spark timing is adjusted to the appropriate timing based on engine operating conditions. In other words, the routine returns to combustion where the engine carries out conventional spark ignition combustion. Next, the routine ends. Alternatively, if the answer to step 312 is no, the routine proceeds to step 318.

At step 318 it is judged if a transition from spark assist to HCCI is requested. If the answer to step 318 is yes, the routine proceeds to step 320, where the temperature of the combustion chamber gas is increased to the autoignition temperature by adjusting engine parameters, such as described herein. For example, valve timing may be adjusted via a cam profile switching mechanism to increase effective compression ratio and retain increased residual exhaust gasses, thereby raising charge temperature. However, various other approaches may also be used, such as application of heat exchangers to heat a stream of intake air and mix the heated and un-heated intake airstreams to control the intake air temperature, or combinations of various parameters. Next, the routine proceeds to step 322 where the spark timing is delayed or discontinued. For example, the spark timing may be delayed to a point past an expected autoignition timing. Next, the routine ends. Alternatively, the answer to step 318 is no, the routine proceeds to step 324.

At step 324 it is judged if a transition from HCCI to spark assist is requested. If the answer to step 324 is yes, the routine proceeds to step 326 where the temperature of the combustion chamber gas is decreased so that autoignition is reduced, and thus spark timing may be used to control the timing of combustion. Thus, the routine proceeds to step 328 where the spark timing is adjusted or initiated. Next, the routine ends. Alternatively, if the answer to step 324 is no, the routine proceeds to step 330.

At step 330 it is judged if a transition from HCCI to SI is requested. If the answer to step 330 is yes, the routine proceeds to step 332 where the temperature control of the combustion chamber gas is discontinued. The temperature control may be discontinued, or gradually reduced, depending on the transition conditions, in one example. For example, the spark assist may gradually be adjusted to conventional spark ignition timing over several cycles, if desired. Thus, the routine then proceeds to step 334 where the spark timing is adjusted or initiated based on engine operating conditions, including temperature, speed, load, and others. Next, the routine ends. Alternatively, the answer to step 330 is no, the routine proceeds to step 336.

At step 336, it is judged if a transition from SI to HCCI is requested. If the answer to step 336 is yes, the routine proceeds to step 338, where the temperature of the combustion chamber gas is increased to the autoignition temperature as described above herein. Next, the routine proceeds to step 340 where the spark timing is delayed or discontinued. Next, the routine ends. Alternatively, the answer to step 336 is no, the routine ends.

Referring to FIG. 3B, a routine is described for identifying the combustion mode and modifying engine operating parameters based on a selected combustion mode. First, at step 350, the engine operating conditions are determined. For example, the routine determines engine speed, load, torque, temperatures (e.g., engine coolant temperature, air temperature, ambient temperature), and other parameters. Next, the routine proceeds to step 352 where the current combustion mode is identified. If SI mode is selected, the routine proceeds to step 354. Next, the routine proceeds to step 356 where the air supplied to the engine is controlled based on the torque requirements of the engine. Next, the routine proceeds to step 358 where fuel is supplied to match the air supplied to the engine in order to create an air/fuel ratio approximately about stoichiometry. Next, the routine ends.

If on the other hand, HCCI mode is selected at step 352, the routine proceeds to step 360. Next, the routine proceeds to step 362 where the temperature of combustion chamber gas is maintained at autoignition temperature near TDC by altering operating parameters, such as those described above herein. For example, the routine may adjust valve timing, valve lift, the ratio of two intake airstreams that flow through or by-pass the heat exchangers, spark timing, EGR, turbo or super charger, and/or combinations thereof. Next, the routine ends.

If, on the other hand, spark assist mode is selected at step 352, the routine proceeds to step 364. Next, the routine proceeds to step 366 where the temperature of combustion chamber gas is maintained within the spark assist temperature range to retard autoignition, as described herein with regard to FIG. 4, for example. Next, the routine proceeds to step 368 where it is judged whether to test for autoignition. As described below, the routine may alter timing of the spark during this mode to determine if there is an expected effect caused by said variation. Such information can be used to vary the mixture temperature to enable improved spark assist combustion timing control.

If the answer to step 368 is no, the routine ends. If the answer to step 368 is yes, the routine proceeds to step 370 where the spark timing is modulated about a prescribed time shortly after TDC. Next, the routine proceeds to step 372 where the temperature of the gas within the combustion chamber is modified based on the spark timing history determined from step 370. For example, if it is determined that the firing of the spark is not controlling the timing of combustion (i.e., autoignition is occurring substantially without the spark), then temperature of the mixture may be reduced to return primary control of combustion timing to the firing of the spark plug. Further, this information can be used to improve transitions between various modes in that a more accurate identification of the limits of autoignition can be identified during engine operation and take into account varying conditions and aging effects. Finally, the routine ends.

Figure 4A:
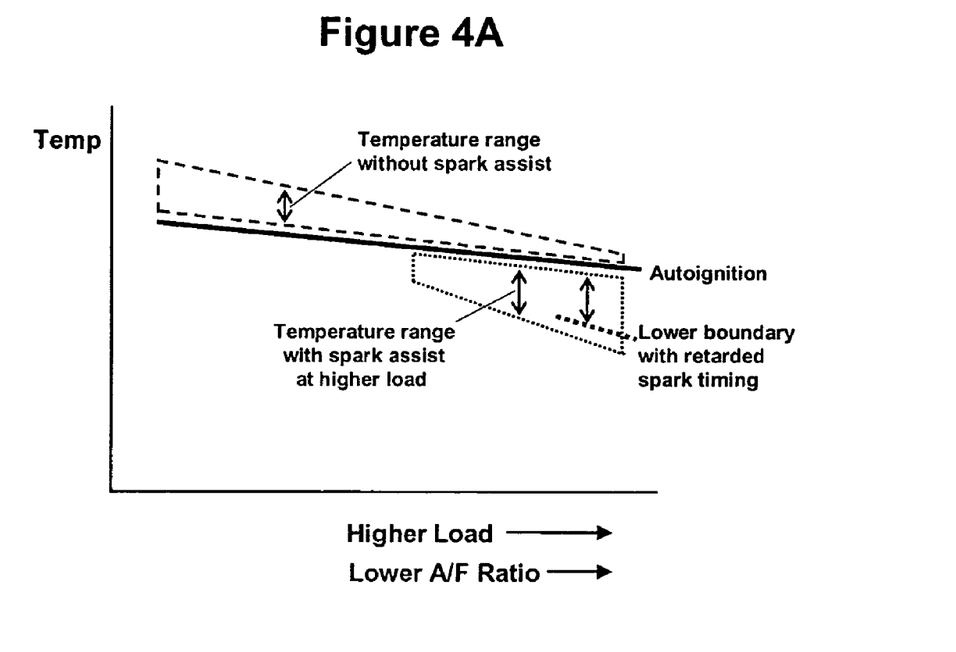
FIGS. 4A and 4B are graphs showing example temperature windows with and without spark assist as a function of engine load and air/fuel ratio.

Referring now to FIG. 4A, it shows a graph of autoignition temperature at various engine loads as the solid line. During periods of high engine load in HCCI mode without spark assist, the acceptable temperature control window decreases with decreased air/fuel ratios, as schematically shown in FIG. 4A. A smaller temperature window results in increased difficulty in autoignition timing control. Additionally, FIG. 4A shows a desired or acceptable temperature range of the air and fuel mixture in the combustion chamber during a spark assist mode at higher loads. The wider temperature window due to spark assistance improves controllability of combustion timing; hence the HCCI operating range can be utilized at higher load. Also, while FIG. 4A shows variation with load, the temperatures or temperature ranges may also vary with combustion air-fuel ratio or the gas/fuel ratio.

Furthermore, combustion timing of spark-assist autoignition at higher load can be further retarded to reduce engine heat transfer losses and constrain the peak cylinder pressure, which affects the required rigidity of engine structure. Without spark assistance, retarding HCCI combustion timing is constrained by misfire. This is because the released heat and radicals generated during the low-temperature reactions at or before TDC may not be sufficient to proceed to high-temperature reactions in the mixture if the gas temperature drops too quickly due to expansion. With a spark occurring after TDC, the combustion timing can be further retarded and thus increase the HCCI operating range to higher loads. It should be pointed out that significantly further retard of spark timing from TDC changes the lower boundary of the temperature range, as shown in FIG. 4A. When the engine load increases and the spark timing is to be further retarded, the engine controller controls the devices, such as the ratio of two intake airstreams that flow through or by-pass the heat exchangers, EGR rate, valve timing, valve lift, or others to increase the gas temperature slowly but continuously to make sure that autoignition can occur with spark assistance. The increase in gas temperature may be stopped when it is detected that the spark plays no role in autoignition, as described later. At that time, the gas temperature may be adjusted to be a slightly lower for using a spark to control combustion timing.

Alternatively, with FIG. 4B, a target temperature range for utilizing the spark-assist mode is shown below the autoignition temperature, where the target temperature range is gradually further from the auto-ignition temperature with increasing load (and/or with decreasing air-fuel ratio). Further, in an alternative embodiment, the lower limit of the temperature range can be a function of air/fuel ratio and the upper limit a function of autoignition temperature and load. The temperature difference, denoted as DT, represents a difference between the autoignition temperature and the upper temperature of the spark assist temperature range. As described herein, this difference can be used to adjust the engine parameters (such as temperature) to provide a greater difference between the mixture temperature and the autoignition temperature as load and or air-fuel ratio changes, thus enabling extension of the spark assist mode. This difference may also be used to facilitate HCCI-SI mode transition, because the mixture temperature is lower and more close to the temperature required for SI combustion.

In other words, as load increases the temperature required for autoignition can decrease due to the increased chemical energy (fuel) density in the mixture and the increased combustion chamber wall temperature. Also, under high load conditions, the temperature range or temperature window decreases with decreased air/fuel ratios due to the increased sensitivity of combustion timing to the change of gas temperature. Hence, as load increases, the control of temperature within the combustion chamber can degrade. Thus, in one embodiment, a desired temperature difference (DT) can be increased with increased load or varying air/fuel ratio in order to account for the greater error associated with temperature control so that autoignition temperature is not achieved, but rather combustion is timed by the firing of the spark plug.

Figure 4B:
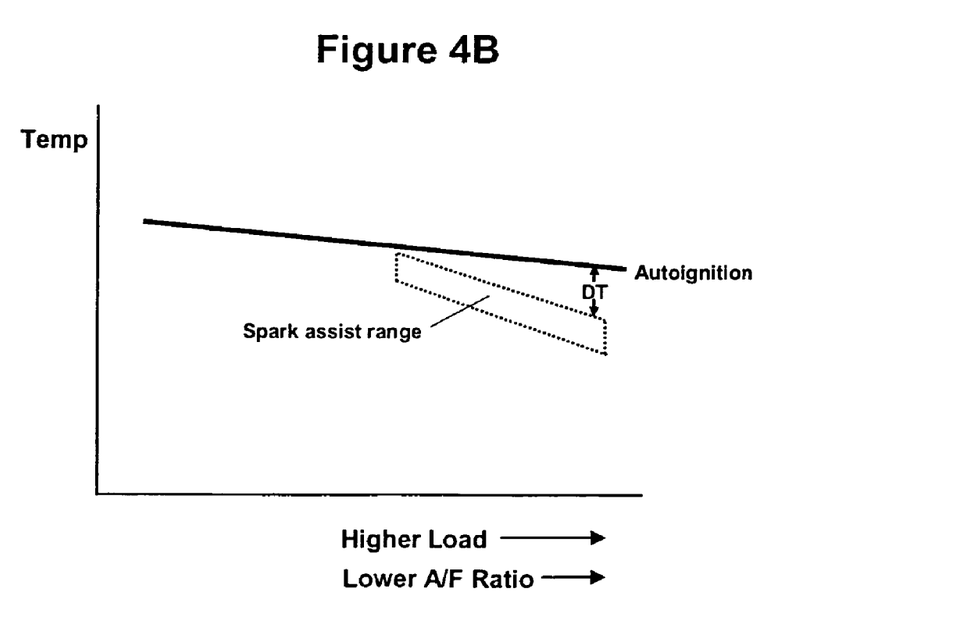
Figure 5:
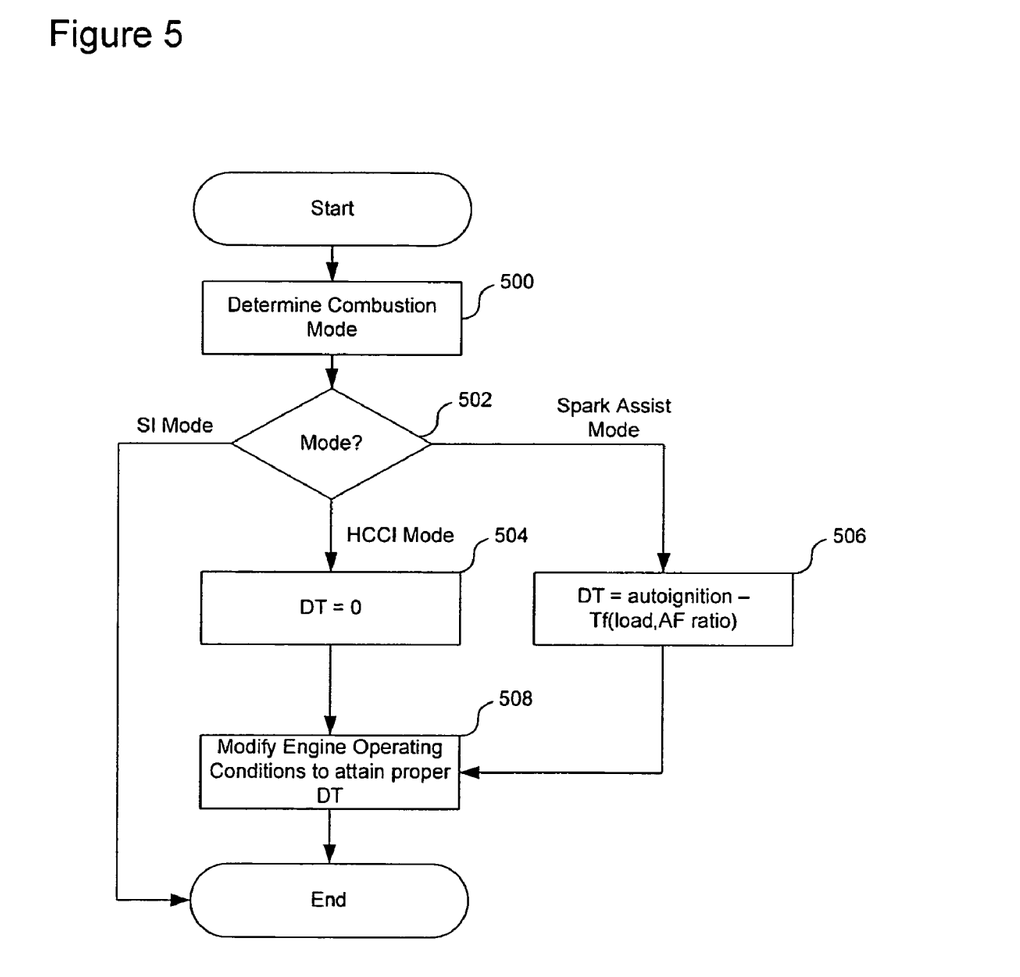
FIG. 5 is a view of an example method for determining the target air and fuel mixture operating temperature.

Referring to FIG. 5, an example routine is described for determining the target engine operating temperature depending on combustion mode utilizing the information in FIGS. 4A and 4B. The routine begins at step 500 where the combustion mode is determined. Next, the routine proceeds to step 502 where the combustion mode is identified, as determined in FIG. 3. If the engine is operating in SI mode the routine ends since temperature control under SI operations may be discontinued or reduced.

Alternatively, if it is judged at step 502 that the engine is operating in HCCI mode, the routine proceeds to step 504, where the temperature difference between the target temperature and autoignition (DT) is set to zero. In other words, the temperature control during an HCCI mode is selected to achieve the autoignition temperature without spark assist.

If, instead it is judged at step 502 that the engine is operating in spark assist mode, the routine proceeds to step 506 where DT is determined as the difference between the autoignition temperature and the upper limit of the spark assist temperature range as a function of load, speed, and/or air/fuel ratio. Next, the routine proceeds to step 508 where the engine operating parameters may be modified in order to attain the target temperature from the calculated DT.

As noted above, adjustment of the target temperature range may occur not only in the spark assist mode, but also when the engine is transitioning between combustion modes. For example, during transition between modes, the target operating temperature may be a function based on the beginning and ending target temperatures of the modes involved in the transition.

Under some conditions, the intake pressure may be adjusted during transitions between combustion modes. For example, the engine may transition from HCCI mode to SI mode when the driver tips-in. During such transitions, this adjustment of intake pressure may be accompanied by a response delay of at least one engine cycle. In the case of an HCCI to SI transition where the adjusted pressure lags and is therefore higher than desired, thus engine knock may occur. Alternatively, during a transition from SI to HCCI mode, this lag may cause the adjusted pressure to be lower than desired, thus unstable combustion may occur. A similar lag may occur with the adjustment of intake air temperature.

Figure 6:
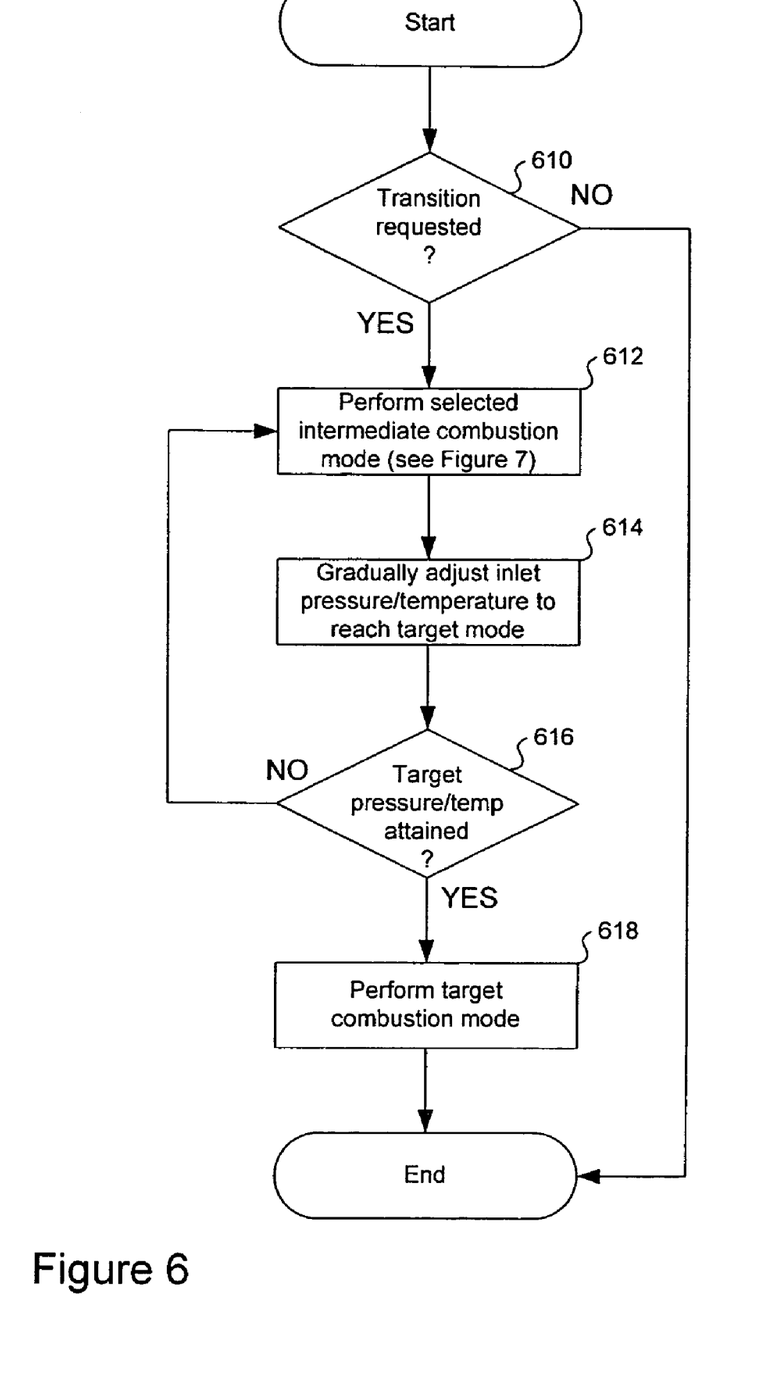
FIG. 6 is a flow chart depicting an example method for transitioning between combustion modes utilizing an intermediate combustion mode.

Referring now to FIG. 6, a flowchart depicting an example method for performing a transition between combustion modes utilizing an intermediate combustion mode is shown. Beginning at step 610, it is judged whether a transition between combustion modes has been requested. If the answer to step 610 is no, the routine ends. Alternatively, if the answer to step 610 is yes, the routine proceeds to step 612. At step 612 an intermediate combustion mode is selected and performed during the transition operation. The intermediate combustion mode may utilize spark assist combustion where multiple fuel injections are performed and later combusted by a spark performed by a spark plug. For example, a first fuel injection may be performed during the intake stroke, while a second fuel injection is performed during the compression stroke in order to form a rich mixture in the vicinity of the spark plug. Alternatively, stratified charge combustion may be utilized for the intermediate combustion mode. In some examples of a stratified charge intermediate combustion mode, a single fuel injection may be performed late in the compression stroke. In a third intermediate combustion mode, a combined combustion operation may be performed where both stratified charge and spark assist modes are utilized. Intermediate mode selection and operation will be discussed in more detail below with reference to FIG. 7.

After an intermediate combustion mode is performed at step 612, the routine proceeds to step 614, where the intake air pressure and/or temperature are adjusted in order to attain a desired pressure and/or temperature target. Adjustment of intake pressure and/or temperature may be accomplished by adjusting a variety of engine parameters such as EGR contribution, valve timing, spark timing, turbocharging, and supercharging, heat exchanger and intercooler contribution, among others. In some examples, the desired pressure/temperature target may be the operating pressure/temperature of the target mode. For example, the temperature target for SI mode may be the ambient temperature, while the temperature target for HCCI mode may be the autoignition temperature.

Next, the routine proceeds to step 616 where it is judged whether the target pressure/temperature of intake air has been attained. If the answer to step 616 is no, the routine returns to step 612. Alternatively, if the answer to step 616 is yes, the routine proceeds to step 618, where the target combustion mode is performed. In this manner, a transition between modes may be performed gradually so that sufficient time is available for adjusting various operating parameters such as intake pressure, intake temperature, air/fuel ratio, combinations thereof and others.

Figure 7:
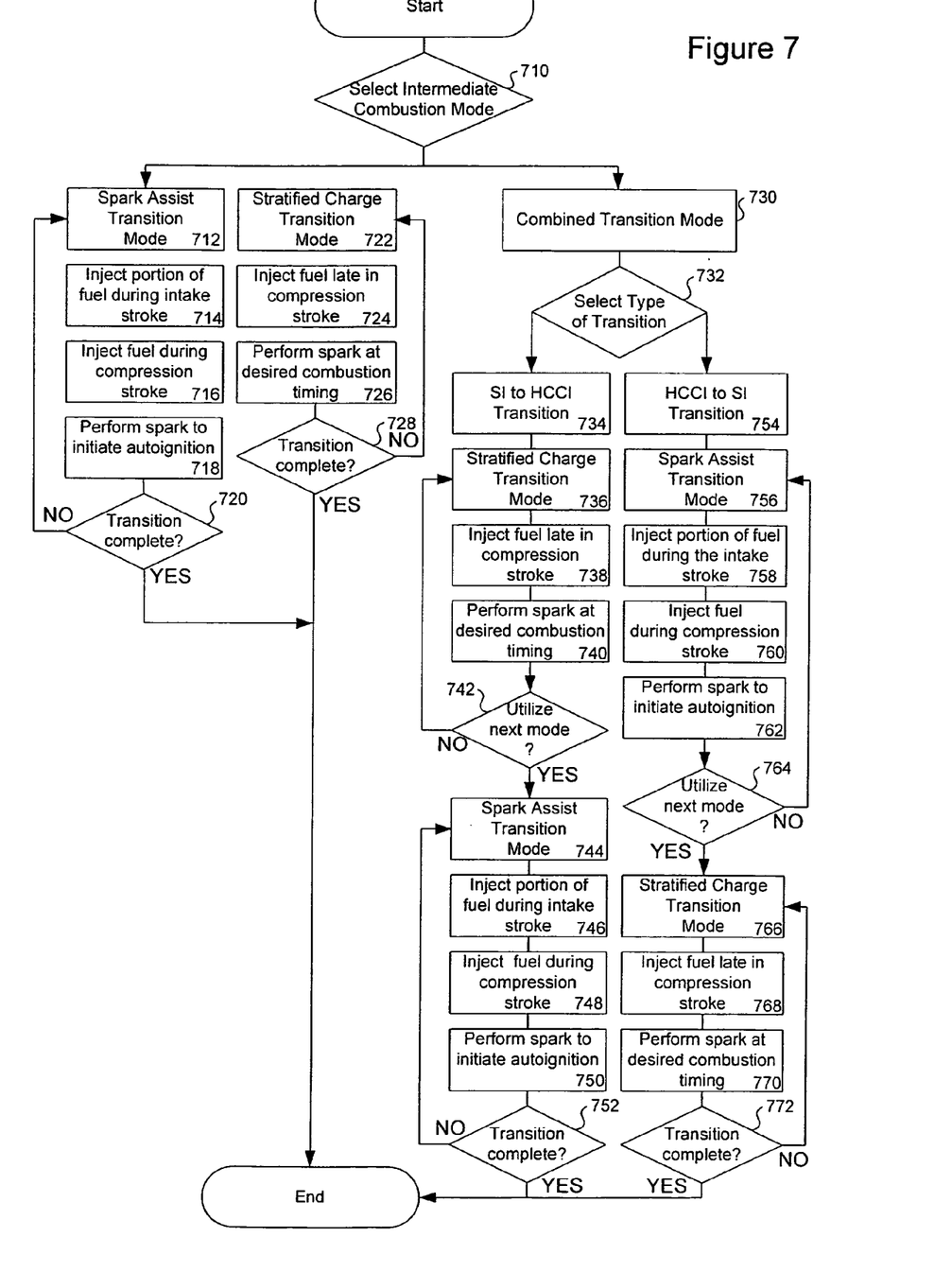
FIG. 7 is a flow chart depicting an example method for selecting and performing the intermediate combustion mode.

Referring now to FIG. 7, a flowchart depicting an example method for performing an intermediate combustion mode as described above by step 612 of FIG. 6 is shown. Beginning at step 710, an intermediate combustion mode is selected. The appropriate intermediate combustion mode may be selected based on a variety of factors such as ambient operating conditions, engine parameters, driver input and type of transition request (i.e. HCCI to SI or SI to HCCI) among others. For example, if the engine is operating in HCCI mode and the driver tips-in, a rapid transition to SI mode may be requested. In this example, a rapid transition may be best facilitated by a particular intermediate mode, which may be selected at step 710. In another example, if a transition to HCCI mode from SI mode is requested, a more gradual transition may be permitted thus a transition mode best facilitating a gradual transition may be selected at step 710.

If at step 710, a spark assist combustion mode is selected, the routine proceeds to step 712, where the spark assist combustion mode is initiated. Next, the routine proceeds to step 714, where a portion of the fuel is injected into the cylinder during the intake stroke in order to form a homogeneous mixture. Next at step 716, a second injection of the remaining fuel is performed during the compression stroke in order to form a pocket of rich mixture in the vicinity of the spark plug. Next, at step 718, the homogeneous mixture is ignited by compression of the spark ignited pocket of rich mixture. The spark assist combustion mode while producing more NOx and causing increased fuel consumption over the unassisted HCCI operation, nonetheless provides a more robust HCCI operation for transitions. Further, since the spark assist combustion mode is utilized primarily as a transitional mode, it may not contribute substantially to the overall NOx and fuel economy of the engine.

Next, at step 720 it is judged whether the requested transition has been completed. In some examples, the requested transition may be complete when the pressure and/or temperature of the intake air attain a value substantially near that of the target mode. When the operating conditions and engine parameters have achieved a desired value, a transition to the target combustion mode may be performed thus completing the transition. Therefore, if the answer at step 720 is no, the routine returns to step 712 where the spark assist combustion mode is utilized for the subsequent engine cycle. Alternatively, if the answer at step 720 is yes, the routine ends as the target combustion mode has been attained.

If a stratified charge combustion mode is instead selected at step 710, the routine proceeds to step 722 where a stratified charge combustion mode is initiated. Next, at step 724, a single fuel injection is performed late in the compression stroke. Next, at step 726, a spark is performed by a spark plug at the desired timing to initiate combustion. Next, at step 728 it is judged whether the requested transition has been completed. If the answer at step 728 is no, the routine returns to step 722 where the stratified charge combustion mode is utilized for the subsequent engine cycle. Alternatively, if the answer at step 728 is yes, the routine ends.

Alternatively, if a combined combustion mode is selected at step 710, the routine proceeds to step 730 where a combined combustion mode is initiated. Next, at step 732, the type of transition is selected. If an SI to HCCI transition is requested, the routine proceeds to step 734 where a combined combustion mode comprising a first stratified charge combustion mode and a second spark assist combustion mode is initiated. Next, the routine proceeds to step 736 where the stratified charge combustion mode is utilized wherein a single fuel injection is performed late in the compression stroke at step 738 and later combusted by a spark performed by a spark plug at step 740.

Next, at step 742 it is judged whether the next combustion mode of the combined combustion mode transition should be utilized. In some examples, the first combustion mode of the transition may be discontinued in favor of a second combustion mode when a prescribed number of cycles has been performed and/or a partial transition state has been attained such as with a partial adjustment of temperature/pressure. If the answer to step 742 is no, the routine returns to step 736 where the stratified charge combustion mode is utilized for the subsequent engine cycle. Alternatively, if the answer to step 742 is yes, the routine proceeds to step 744 where a spark assist combustion mode is initiated. Next, multiple fuel injections are performed at steps 746 and 748 and a spark plug is used to initiate autoignition of the homogeneous mixture at step 750. Next, at step 752 it is judged whether the requested transition has been completed. If the answer at step 752 is no, the routine returns to step 744 where the spark assist combustion mode is utilized for the subsequent engine cycle. Alternatively, if the answer at step 752 is yes, the routine ends.

Alternatively, if an HCCI to SI transition is requested at step 732, the routine proceeds to step 754. At step 754, an HCCI to SI transition is initiated where a combined combustion mode is utilized during transition comprising a first spark assist combustion mode and a second stratified charge combustion mode. At step 756 a first spark assist combustion mode is utilized during the first stage of the transition. Next multiple fuel injections are performed at steps 758 and 760 and a spark plug is used to initiate autoignition at step 762.

Next, at step 764 it is judged whether the next combustion mode should be utilized during the transition. If the answer to step 764 is no, the routine returns to step 756 where the spark assist combustion mode is utilized for the subsequent engine cycle. Alternatively, if the answer to step 764 is yes, the routine proceeds to step 766 where a stratified charge combustion mode is initiated wherein a single fuel injection is performed late in the compression stroke at step 768 and later combusted by a spark performed by a spark plug at step 770. Next, at step 772 it is judged whether the requested transition has been completed. If the answer at step 772 is no, the routine returns to step 766 where the stratified charge combustion mode is utilized for the subsequent engine cycle. Alternatively, if the answer at step 772 is yes, the routine ends.

In this manner, three intermediate modes: stratified charge, spark assist or a combination thereof may be utilized for the transition between SI and HCCI combustion modes. The utilization of an intermediate mode may be used to prolong the transition for at least one engine cycle may facilitate the adjustment of various engine parameters such as intake pressure and/or temperature. Therefore, the intermediate combustion modes proposed herein provide robust and stable combustion through the transition operation.

Note that the control and estimation routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

Figure 8:
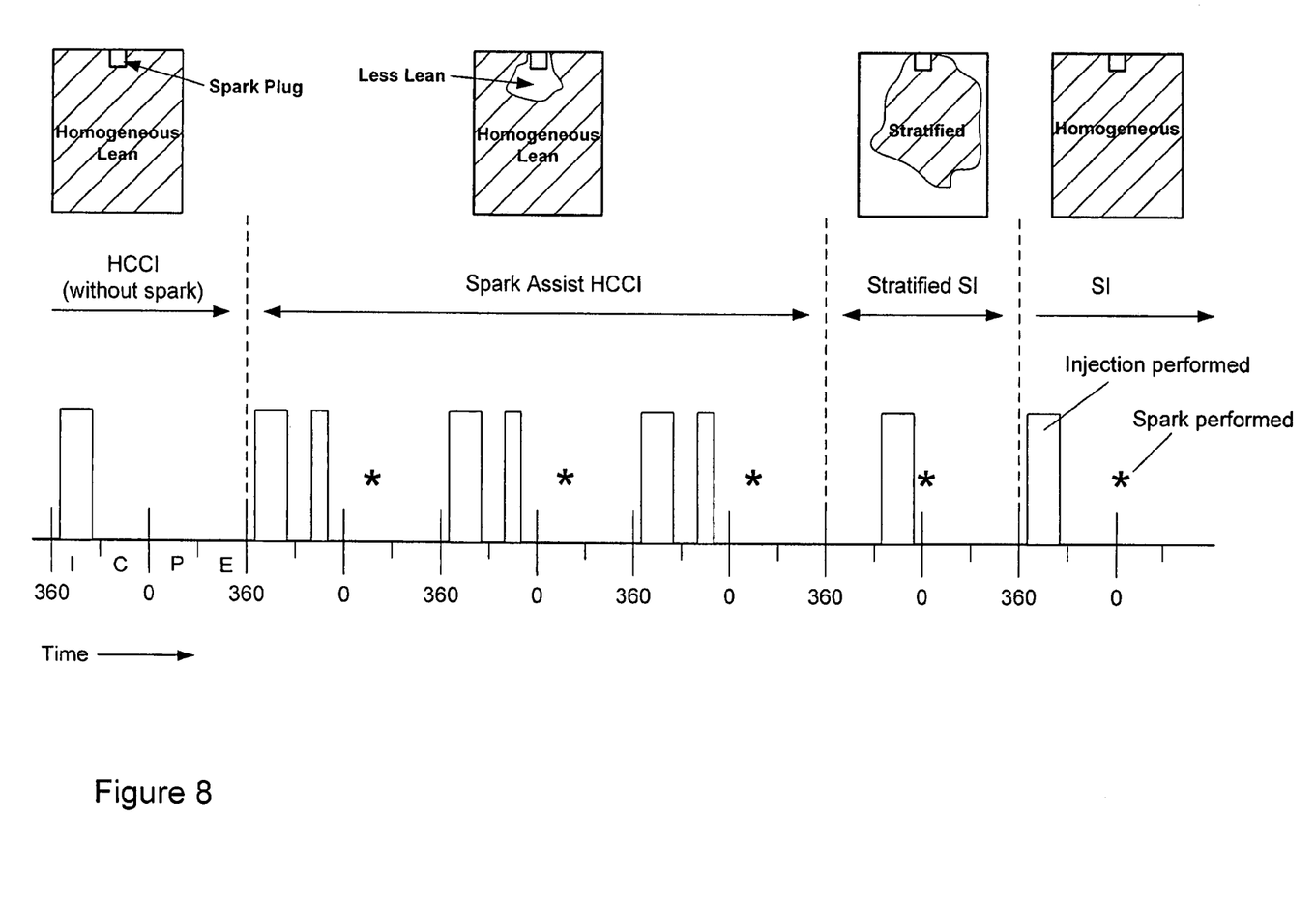
FIG. 8 is a fuel injection timing diagram depicting an example injection strategy for a transition from HCCI mode to SI mode using two intermediate combustion modes.

Referring now to FIG. 8, an injection timing diagram for an example transition strategy is shown. Specifically, the timing diagram begins on the left with the engine operating in HCCI mode without an assist spark. Shortly after 360 degrees of the first cycle a single injection is performed during the intake stroke to form a homogeneous lean air/fuel mixture as shown in the example cylinder above.

Next, a spark assist HCCI mode is used for several cycles of the transition where a first injection is performed during the intake stroke and a second injection is performed during the compression stroke. However, under some conditions, a different number of cycles may be used or alternatively the mode may be bypassed during the transition. The first injection can be used to create a homogeneous lean air/fuel mixture in the cylinder and a second subsequent injection can be used to create a less lean region in the vicinity of the spark plug as shown above in the example cylinder. Next, a spark performed after 0 degrees (TDC) can initiate compression ignition of the air/fuel mixture. In this manner, a spark assist HCCI mode may be used during the transition to permit a gradual adjustment of the engine operating parameters prior to attaining the target SI mode.

It should be noted that during the spark assist transition mode the spark is performed later than during the stratified charge and SI modes due to greater burn duration experienced by the stratified charge and SI modes caused by flame propagation. The greater spark retard of the spark assist mode should be made apparent in FIG. 8.

Next, a stratified SI mode is used for a single cycle where a single injection is performed during the compression stroke and spark is performed around 0 degrees (TDC) to initiate combustion. However, a different number of cycles may be used or alternatively the mode may be bypassed during the transition. The single injection during the compression stroke can be used to create a stratified air/fuel mixture as shown above in the example cylinder. In this manner, a stratified SI mode may be used during the transition to permit a gradual adjustment of engine operating parameters prior to attaining the target SI mode.

Next, the target SI mode is attained by performing a single injection during the intake stroke and later performing a spark around 0 degrees (TDC) to initiate combustion. The single injection can be used to create a homogeneous air/fuel mixture that is approximately stoichiometry as shown above in the example cylinder.

FIG. 8 shows one example transition strategy, however various others are possible. For example, under some conditions the spark assist HCCI mode and/or the stratified SI mode may be bypassed. Alternatively, depending on the current engine mode and the target mode the order or duration of the transition modes may differ. For example, as discussed above with reference to FIG. 7, a transition from SI mode to HCCI mode may utilize a first stratified transition mode and a second spark assist transition mode prior to attaining the target HCCI mode.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of operating an internal combustion engine having a combustion chamber with a piston and a spark plug, comprising:
    when transitioning between spark ignition combustion and autoignition combustion, creating a first mixture of air and fuel, adjusting an operating condition of the engine so that said first mixture of air and fuel in the combustion chamber approaches, but does not achieve, the autoignition temperature, and performing a spark from the spark plug so that at least a portion of said first mixture combusts to raise a remaining portion of said first mixture to said autoignition temperature; wherein said spark for said first mixture is performed after top dead center of piston position.

2. The method of claim 1 further comprising, during said transition, performing an injection during a compression stroke so that a second stratified mixture of air and fuel is formed; and performing a spark from the spark plug so that the second mixture combusts.

3. The method of claim 1 wherein said first mixture is created by performing a first injection during an intake stroke so that a lean homogeneous air and fuel region is created, performing a second injection during a compression stroke so that a less lean homogeneous air and fuel region is created substantially near the spark plug.

4. A method of operating an internal combustion engine having a combustion chamber with a piston, an in-cylinder fuel injector, and a spark plug comprising:
    during a first mode, performing an injection before a compression stroke to create a first substantially homogenous mixture of fuel and air; and performing a spark from a spark plug so that the first mixture combusts;
    during a second mode, performing an injection during a compression stroke to create a second mixture of stratified air and fuel; and performing a spark from the spark plug so that the second mixture combusts;
    during a third mode, creating a third air and fuel mixture by performing a first injection during an intake stroke so that a lean homogeneous air and fuel region is created and performing a second injection during a compression stroke so that a less lean homogeneous air and fuel region is created substantially near the spark plug; adjusting an operating condition of the engine so that said third mixture of air and fuel in the combustion chamber approaches, but does not achieve, the autoignition temperature; and performing a spark from the spark plug after top dead center of piston position so that the third mixture combusts; and
    during a fourth mode, adjusting an operating condition of the engine so that a fourth mixture of air and fuel in the combustion chamber attains an autoignition temperature and combusts without requiring a spark from the spark plug.

5. The method of claim 4, wherein the first mode is used during a period of higher engine load than said fourth mode.

6. The method of claim 4, wherein the first mode is used during an engine warm up period.

7. The method of claim 4, wherein the second mode is used for at least one cycle during a transition between the first mode and the fourth mode.

8. The method of claim 4, wherein the third mode is used for at least one cycle during a transition between the first mode and the fourth mode.

9. The method of claim 4, wherein the second mode is used for at least one cycle and then the third mode is used for at least one cycle during a transition from the first mode to the fourth mode.

10. The method of claim 4, wherein the third mode is used for at least one cycle and then the second mode is used for at least one cycle during a transition from the fourth mode to the first mode.

11. A method of operating an internal combustion engine having a combustion chamber with a piston, an in-cylinder fuel injector, and a spark plug comprising:
    during a first transition between operating modes, creating a first mixture of air and fuel by performing a first injection during an intake stroke so that a lean homogeneous air and fuel region is created, performing a second injection during a compression stroke so that a less lean homogeneous air and fuel region is created substantially near the spark plug, and adjusting an operating condition of the engine so that said first mixture of air and fuel in the combustion chamber approaches, but does not achieve, the autoignition temperature; and performing a spark from the spark plug after top dead center of piston position so that at least a portion of said first mixture combusts by autoignition; and
    during a second transition between operating modes, performing an injection during a compression stroke so that a second stratified mixture of air and fuel is formed; and performing a spark from the spark plug so that the second mixture combusts.

12. The method of claim 11, wherein the first transition mode is utilized for at least one cycle when transitioning from a spark ignition mode to a compression ignition mode.

13. The method of claim 11, wherein the second transition mode is utilized for at least one cycle when transitioning from a spark ignition mode to a compression ignition mode.

14. The method of claim 11, wherein the first transition mode is utilized for at least one cycle when transitioning from a compression ignition mode to a spark ignition mode.

15. The method of claim 11, wherein the second transition mode is utilized for at least one cycle when transitioning from a compression ignition mode to a spark ignition mode.

16. The method of claim 11, wherein the first transition mode is utilized for at least one cycle and later the second transition mode is utilized for at least one cycle when transitioning from a compression ignition mode to a spark ignition mode.

17. The method of claim 11, wherein the second transition mode is utilized for at least one cycle and later the first transition mode is utilized for at least one cycle, when transitioning from a spark ignition mode to a compression ignition mode.

18. A method of operating an internal combustion engine having a combustion chamber with a piston and a spark plug, comprising:
when transitioning between spark ignition combustion and autoignition combustion, creating a first mixture of air and fuel, adjusting an operating condition of the engine so that said first mixture of air and fuel in the combustion chamber approaches, but does not achieve, the autoignition temperature, and performing a spark from the spark plug so that at least a portion of said first mixture combusts to raise a remaining portion of said first mixture to said autoignition temperature; and
during said transition, performing an injection during a compression stroke so that a second stratified mixture of air and fuel is formed and performing a spark from the spark plug so that the second mixture combusts.

19. The method of claim 18, wherein said spark for said first mixture is performed after top dead center of piston position.

20. A method of operating an internal combustion engine having a combustion chamber with a piston and a spark plug, comprising:
when transitioning between spark ignition combustion and autoignition combustion, creating a first mixture of air and fuel, adjusting an operating condition of the engine so that said first mixture of air and fuel in the combustion chamber approaches, but does not achieve, the autoignition temperature, and performing a spark from the spark plug so that at least a portion of said first mixture combusts to raise a remaining portion of said first mixture to said autoignition temperature;
wherein said first mixture is created by performing a first injection during an intake stroke so that a lean homogeneous air and fuel region is created and performing a second injection during a compression stroke so that a less lean homogeneous air and fuel region is created substantially near the spark plug.

* * * * *